US 9,135,298 B2

(12) United States Patent
Day et al.

(10) Patent No.: US 9,135,298 B2
(45) Date of Patent: Sep. 15, 2015

(54) AUTONOMICALLY GENERATING A QUERY IMPLEMENTATION THAT MEETS A DEFINED PERFORMANCE SPECIFICATION

(75) Inventors: Paul Reuben Day, Rochester, MN (US); Brian Robert Muras, Rochester, MN (US); Anne Marie Ryg, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 2038 days.

(21) Appl. No.: 12/107,938

(22) Filed: Apr. 23, 2008

(65) Prior Publication Data

US 2008/0215535 A1    Sep. 4, 2008

Related U.S. Application Data

(63) Continuation of application No. 10/860,402, filed on Jun. 3, 2004.

(51) Int. Cl.
*G06F 17/30*        (2006.01)

(52) U.S. Cl.
CPC .... *G06F 17/30433* (2013.01); *G06F 17/30463* (2013.01)

(58) Field of Classification Search
CPC ..................... G06F 17/30433; G06F 17/30463
USPC .......................................................... 707/200
See application file for complete search history.

(56) References Cited

U.S. PATENT DOCUMENTS

| | | | |
|---|---|---|---|
| 5,794,229 A | 8/1998 | French et al. | |
| 5,819,255 A * | 10/1998 | Celis et al. | 1/1 |
| 5,960,428 A | 9/1999 | Lindsay et al. | |
| 6,026,391 A | 2/2000 | Osborn et al. | |
| 6,321,218 B1 * | 11/2001 | Guay et al. | 1/1 |
| 6,353,818 B1 * | 3/2002 | Carino, Jr. | 1/1 |
| 6,360,214 B1 | 3/2002 | Ellis et al. | |
| 6,366,901 B1 | 4/2002 | Ellis | |
| 6,466,931 B1 | 10/2002 | Attaluri et al. | |
| 7,007,009 B2 | 2/2006 | Bestgen et al. | |
| 7,031,958 B2 | 4/2006 | Santosuosso | |
| 7,099,858 B2 | 8/2006 | Aldrich et al. | |
| 2002/0198867 A1 | 12/2002 | Lohman et al. | |
| 2003/0093408 A1 | 5/2003 | Brown et al. | |
| 2003/0115183 A1 | 6/2003 | Abdo et al. | |
| 2003/0115212 A1 | 6/2003 | Hornibrook et al. | |
| 2003/0182276 A1 * | 9/2003 | Bossman et al. | 707/3 |
| 2003/0200204 A1 | 10/2003 | Limoges et al. | |
| 2003/0212668 A1 | 11/2003 | Hinshaw et al. | |
| 2004/0210579 A1 | 10/2004 | Dettinger et al. | |

(Continued)

*Primary Examiner* — Apu Mofiz
*Assistant Examiner* — Jared Bibbee
(74) *Attorney, Agent, or Firm* — Martin & Associates, LLC; Derek P. Martin

(57) ABSTRACT

A database query optimizer allows specifying a performance specification for a query. When an access plan is created, the actual performance for executing the query using the access plan is determined and compared to the performance specification for the query. If the actual performance does not satisfy the performance specification for the query, the query optimizer autonomically generates a different access plan to see if the performance improves. If an access plan that meets the performance specification is generated, the new access plan is stored in the access plan cache for the query. If no access plan can be generated that meets the performance specification for the query, the access plan that provided the best performance is selected and stored in the access plan cache for the query.

2 Claims, 5 Drawing Sheets

(56) References Cited

U.S. PATENT DOCUMENTS

| | | |
|---|---|---|
| 2004/0225639 A1 | 11/2004 | Jakobsson et al. |
| 2005/0065928 A1 | 3/2005 | Mortensen et al. |
| 2005/0108199 A1 | 5/2005 | Ellis et al. |
| 2006/0004695 A1 | 1/2006 | Day et al. |
| 2006/0031189 A1 | 2/2006 | Muras et al. |
| 2006/0085375 A1 | 4/2006 | Egan et al. |

\* cited by examiner

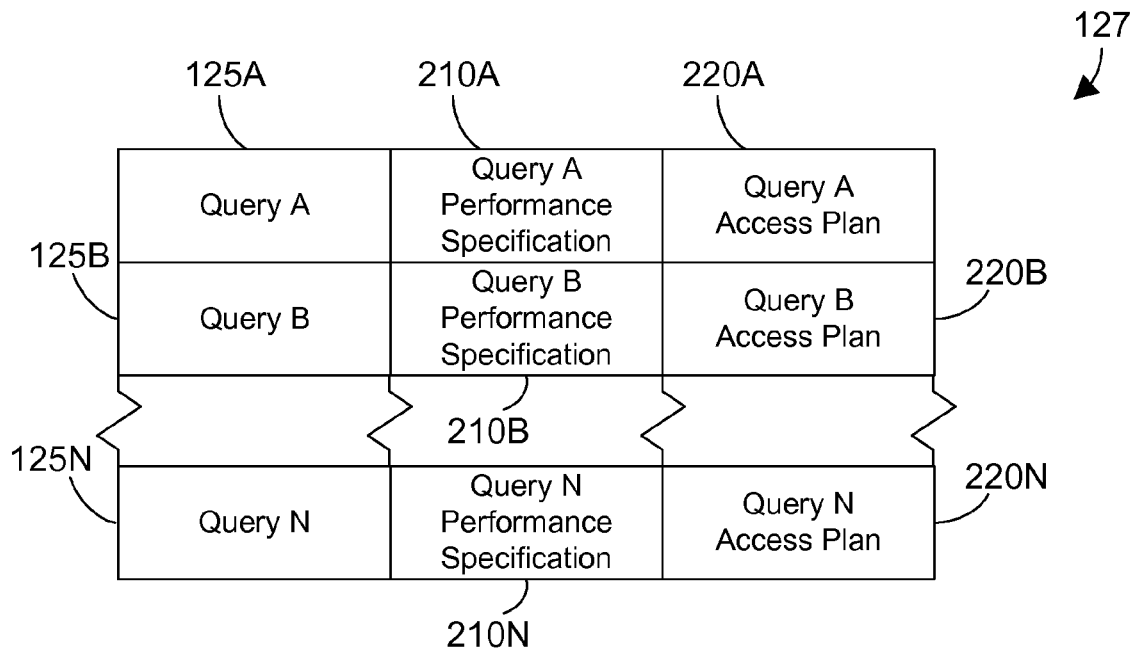
FIG. 2
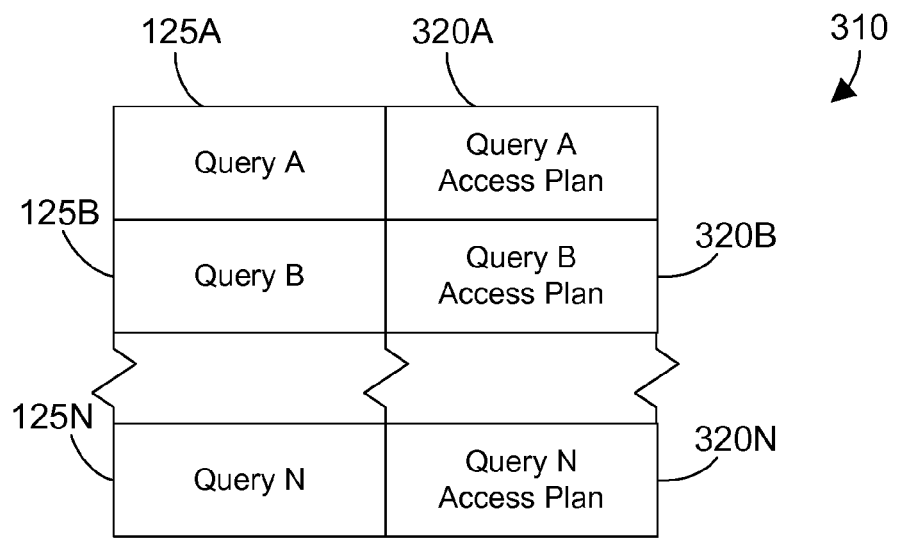
FIG. 3        Prior Art

Select count(*) from X, Y, Z
where X.j1 = Y.j1 and X.j2 = Z.j2

FIG. 5

Table X

| j1 | j2 |
|---|---|
| A | 0 |
| B | 1 |
| C | 2 |
| D | 3 |
| E | 4 |
| F | 5 |
| G | 6 |
| H | 7 |
| I | 8 |
| J | 9 |

Table Y

| j1 |
|---|
| A |
| A |
| B |
| B |
| C |
| C |
| D |
| D |
| E |
| E |
| F |
| F |
| G |
| G |
| H |
| H |
| I |
| I |
| J |
| J |

Table Z

| j2 |
|---|
| 11 |
| 11 |
| 12 |
| 12 |
| 13 |
| 13 |
| 14 |
| 14 |
| 15 |
| 15 |
| 16 |
| 16 |
| 17 |
| 17 |
| 18 |
| 18 |
| 19 |
| 19 |
| 20 |
| 20 |

| 125 Query | 210 Performance Spec. | 220 Access Plan |
|---|---|---|
| Select count(*) from X, Y, Z where X.j1 = Y.j1 and X.j2 = Z.j2 | 30 time units | X->Y->Z join order |

FIG. 8

| 125 Query | 210 Performance Spec. | 220 Access Plan |
|---|---|---|
| Select count(*) from X, Y, Z where X.j1 = Y.j1 and X.j2 = Z.j2 | 30 time units | X->Z->Y join order |

FIG. 9

Performance Specification

| 100 ms |
|---|

FIG. 10

Performance Specification

| 800 Processor Cycles |
|---|

FIG. 11

Performance Specification

| 400 Bus Cycles |
|---|

FIG. 12

Performance Specification

| 200 Disk I/Os |
|---|

FIG. 13

Performance Specification

| If TT < 100 ms, 10*TT |
| If 100ms<TT<10 s, 3*TT |
| If 10 s<TT<eight hours, 2*TT |
| If TT>eight hours, 1.5*TT |

FIG. 14

Performance Specification

| Average of last N executions |
|---|

AUTONOMICALLY GENERATING A QUERY IMPLEMENTATION THAT MEETS A DEFINED PERFORMANCE SPECIFICATION

CROSS-REFERENCE TO PARENT APPLICATION

This patent application is a continuation of a "Apparatus and Method for Autonomically Generating a Query Implementation that Meets a Defined Performance Specification," U.S. Ser. No. 10/860,402 filed on Jun. 3, 2004, which is incorporated herein by reference.

BACKGROUND OF THE INVENTION

1. Technical Field

This invention generally relates to computer systems, and more specifically relates to apparatus and methods for optimizing the run-time performance of a database query.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result.

Queries that are frequently run may be optimized to enhance system performance. One known way to optimize a query is to build an access plan the first time a query is run, then reuse the access plan for subsequent executions of the same query. Note, however, that the performance of the query may be fine at the point in time when the access plan was generated, but due to changes in the database, software, etc., the same access plan may experience a marked slowdown in query performance. In addition, because the initial access plan is based on an estimate of performance instead of on actual execution time, the initial access plan may not be a very efficient implementation of the query. In the prior art, there is no way for the database optimizer to detect when an access plan performs poorly. Without a way to specify desired performance for a query and autonomically generate a new access plan when the current access plan no longer satisfies the desired performance, the database industry will continue to suffer from undue performance penalties by continually reusing access plans that provide poor performance in executing a query.

DISCLOSURE OF INVENTION

According to the preferred embodiments, a database query optimizer allows specifying a performance specification for a query. When an access plan is created, the actual performance for executing the query using the access plan is determined and compared to the performance specification for the query. If the actual performance does not satisfy the performance specification for the query, the query optimizer autonomically generates a different access plan to see if the performance improves. If an access plan that meets the performance specification is generated, the new access plan is stored in the access plan cache for the query. If no access plan can be generated that meets the performance specification for the query, the access plan that provided the best performance is selected and stored in the access plan cache for the query.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a block diagram showing the details of the query access plan cache 127 shown in FIG. 1;

FIG. 3 is a block diagram of a prior art access plan cache;

FIG. 5 shows a sample query for illustrating the concepts of the preferred embodiments;

FIG. 6 shows three sample tables with sample data that represent the tables referenced in the query of FIG. 5;

FIG. 7 is a block diagram of an entry in the access plan cache in FIG. 2 in accordance with the preferred embodiments;

FIG. 8 is a block diagram of the entry in FIG. 7 after the query optimizer performs method 400 in FIG. 4 to generate a better query implementation; and FIGS. 9-14 each show different ways to specify a query performance specification for a query in the access plan cache of the preferred embodiments.

Figure 1:
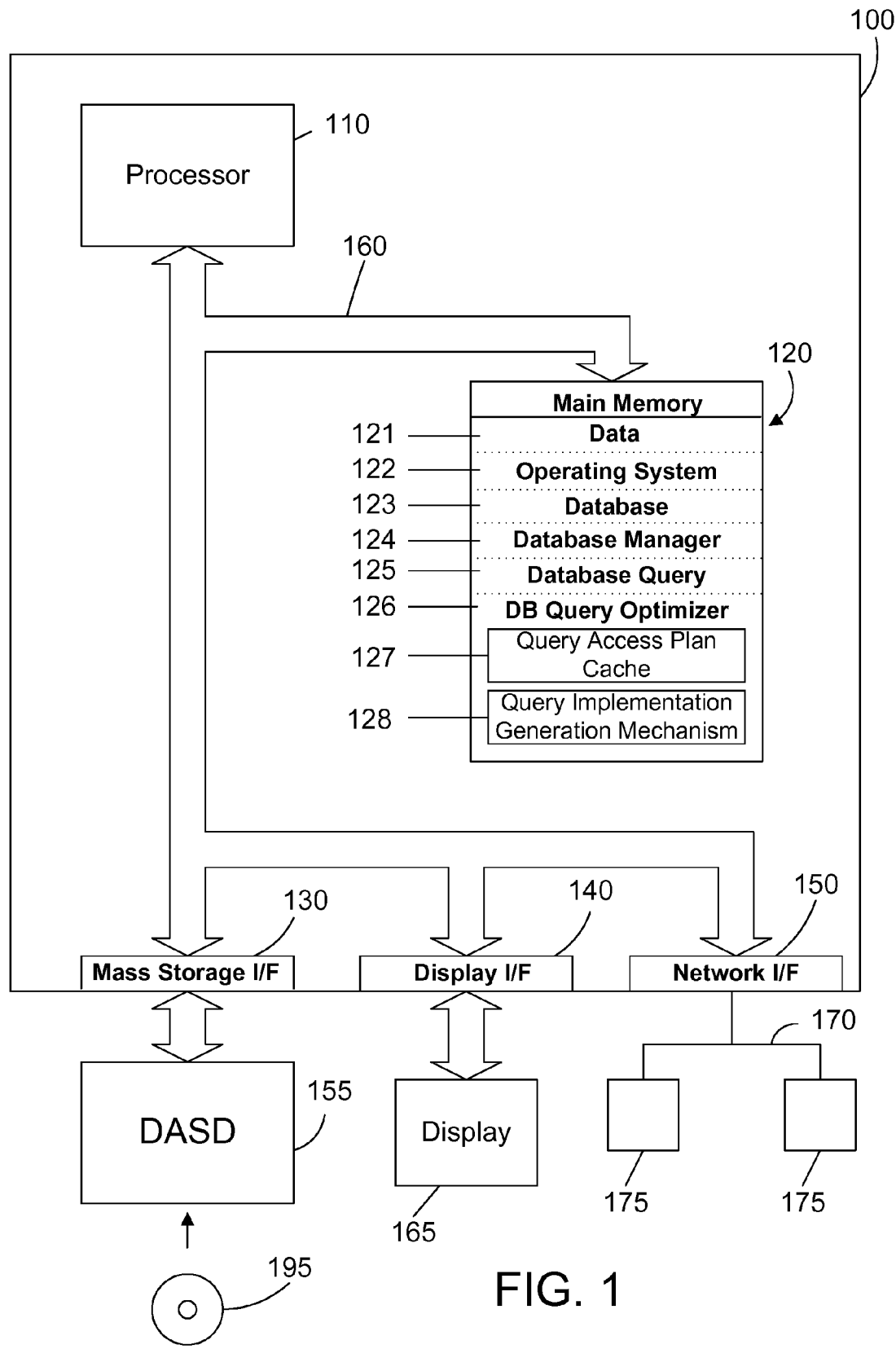
FIG. 1 is a block diagram of an apparatus in accordance with the preferred embodiments.

BEST MODE FOR CARRYING OUT THE INVENTION 1.0 Overview

The present invention relates to optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. One sample SQL query is shown in FIG. 5. The "select count(*)" statement tells the database query processor to count the occurrence of data values, the "from X, Y, Z" statement identifies three database tables, namely X, Y and Z, to search, and the "where" clause specifies expressions (or predicates) that must be satisfied for a record to be included in the resulting dataset. For this particular example, the "where" clause states: "where $X.j1=Y.j1$ and $X.j2=Z.j2$. The term $X.j1$ means column j1 in table X. In similar fashion, the term $Y.j1$ means column j1 in table Y, the term $X.j2$ means column j2 in table X, and the term $Z.j2$ means column j2 in table Z. Sample database tables X, Y, Z with arbitrary sample data is shown in FIG. 6. Thus, the query of FIG. 5 will count the number of records where $X.j1=Y.j1$ and $X.j2=Z.j2$. Note that the query of FIG. 5 is expressed in terms of columns $X.j1$, $X.j2$, $Y.j1$, and $Z.j2$, which are columns defined on the database tables X, Y and Z as shown in FIG. 6. Information about the internal storage of the data is not required as long as the query is written in terms of expressions that relate to values in columns from tables.

We assume the query of FIG. 5 is executed. The first time the query is executed, an access plan for the query is generated. An access plan is one way that the database manager may process the query. An access plan represents one possible implementation for executing a query. The access plan may be stored in an access plan cache, which is represented as 310 in FIG. 3. The access plan cache 310 contains one or more queries 125 with their corresponding access plans 320. Thus, query A 125A has a corresponding access plan 320A; query B 125B has a corresponding access plan 320B; and query N 125N has a corresponding access plan 320N. In the prior art access plan cache 310 shown in FIG. 3, the access plan that is selected to run the query the first time is typically stored in the access plan cache. Note, however, that the access plan is selected based on estimates of performance. Experience has shown that such estimates are not always accurate, and the run-time performance of a query using a selected access plan may be orders of magnitude greater than the estimated performance. Access plans may be rebuilt by the optimizer when certain changes to the database occur. However, the new access plan is still based on an estimated performance, not on actual run-time performance. Herein lies two fundamental problems with the prior art. First, the prior art does not monitor the run-time performance of queries. Second, even if the prior art did monitor the run-time performance of queries, it would have no way of knowing whether the run-time performance is acceptable or not. The end result with the prior art is the use of access plans that may have run-time performance that is grossly inefficient compared to their estimated performance.

2.0 Description of the Preferred Embodiments

The present invention avoids the problems discussed above in the prior art by storing a query performance specification with each access plan stored in the access plan cache. This query performance specification allows the database manager to detect when the performance of the query becomes unacceptable. Should the performance of the stored access plan become unacceptable (i.e., it no longer satisfies the query performance specification), the query optimizer may generate other access plans in an attempt to generate one that satisfies the query performance specification. If no access plan can be generated that satisfies the query performance specification, the access plan that provided the best performance may be selected. In this manner, the query optimizer dynamically and autonomically detects when query performance becomes unacceptable, and makes appropriate corrections to keep the database performance as high as possible.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database manager 124, one or more database queries 125, and a database query optimizer 126. Data 121 represents any data that serves as input to or output from any program in computer system 100. Operating system 122 is a multitasking operating system known in the industry as iSeries; however, those skilled in the art will appreciate that the spirit and scope of the present invention is not limited to any one operating system. Database 123 is any suitable database, whether currently known or developed in the future. Database 123 preferably includes one or more tables. Database manager 124 provides an interface to database 123, processing queries and returning the query results. Database query 125 is a query in a format compatible with the database 123 that allows retrieval of information stored in the database 123 that satisfies the database query 125. Database query optimizer 126 processes database query 125 to optimize database query 125. Database query optimizer 126 includes an access plan cache 127 that stores access plans and corresponding query performance specifications in accordance with the preferred embodiments. Details of the access plan cache 127 in FIG. 1 are shown in FIG. 2. Each entry in the access plan cache 127 includes the query 125, a performance specification for the query 210, and a stored access plan 220. Thus, access plan cache 127 includes an entry 125A that corresponds to Query A, the performance specification 210A for query A, and the stored access plan 220A for query A. In similar fashion, an entry 125B that corresponds to Query B includes a performance specification 210B for query B, and the stored access plan 220B for query B. Other queries may also be stored in the access plan cache 127, as shown by entry 125N that corresponds to Query N that includes a performance specification 210N for query N, and the stored access plan 220N for query N. Note that the main difference between the access plan cache 127 of the preferred embodiments and the prior art access plan cache 310 shown in FIG. 3 is the presence of the query performance specification for each entry in the access plan cache 127 in FIG. 2. This difference allows the query optimizer to autonomically determine when the performance of the stored access plan becomes unacceptable. Once the query optimizer determines that the stored access plan in the access plan cache does not meet the query performance specification, the query optimizer may use the query implementation generation mechanism 128 (FIG. 1) to autonomically generate a different access plan that provides improved performance in executing the query. The query implementation generation mechanism 128 generates one or more different access plans in an attempt to generate an access plan that meets the performance specification for the query. Should the query implementation generation mechanism 128 fail to generate a query implementation (or access plan) that meets the performance specification for the query, the query implementation generation mechanism 128 may select the query implementation that yielded the best performance. In addition, the query implementation generation mechanism 128 may change the query performance specification if no query implementation is generated that satisfies the query performance specification. One suitable way to change the query performance specification is to use the best performance to generate a suitable query performance specification.

While database query optimizer 126 is shown in FIG. 1 to be separate from the other items in main memory 120, it is also within the scope of the preferred embodiments to include the database query optimizer 126 as part of the database manager 124, or as part of any other computer program. In addition, the access plan cache 127 may be part of the query optimizer 126, or may be separate from the query optimizer 126.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 124, database query 125, and database query optimizer 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 4:
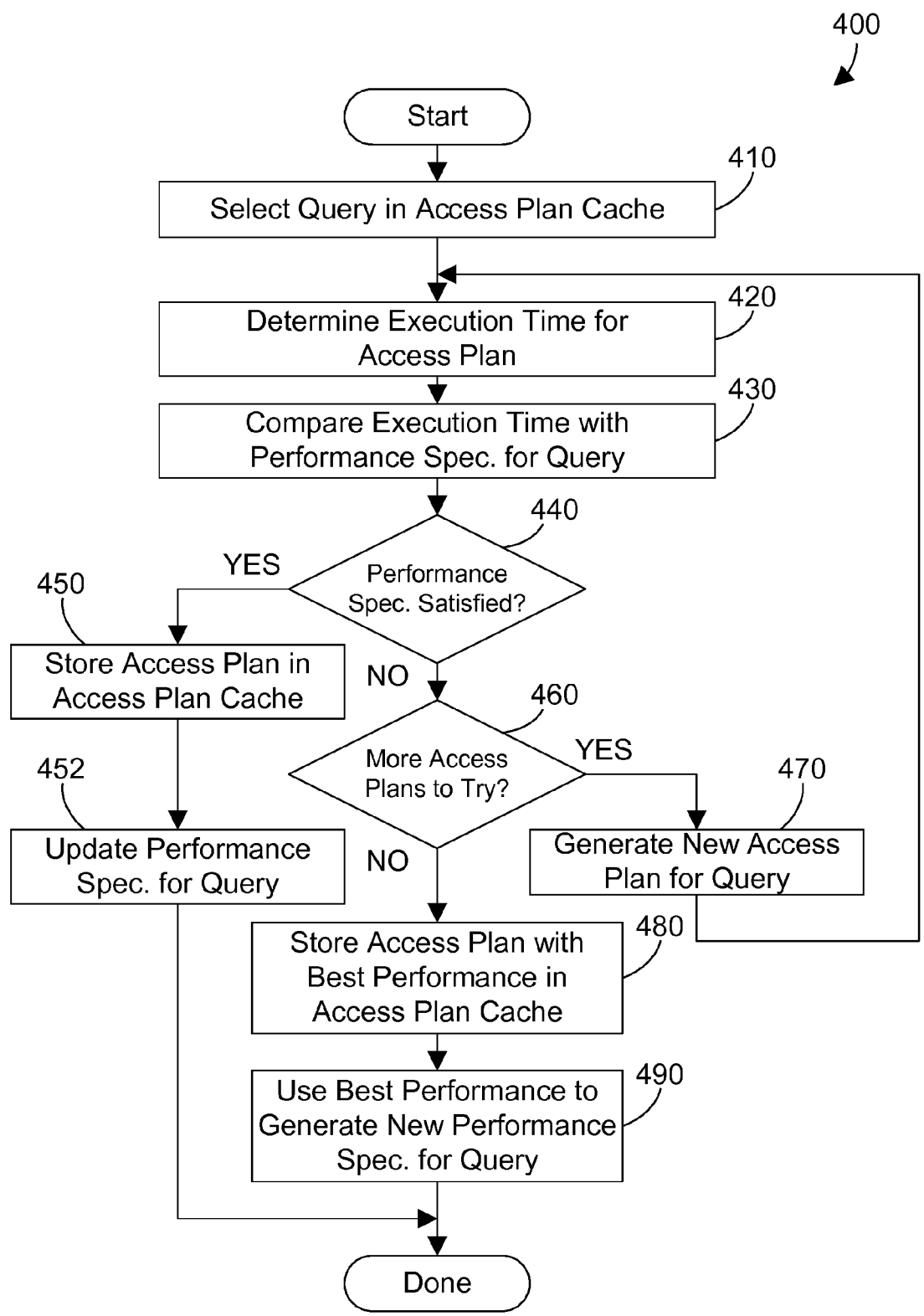
FIG. 4 is a flow diagram of a method in accordance with the preferred embodiments for autonomically detecting when query performance degrades and for generating a different query implementation that improves the performance of executing the query.

Referring to FIG. 4, a method 400 in accordance with the preferred embodiments begins by selecting a query in an access plan cache (step 410). The execution time for the query using the access plan is determined (step 420). Note that the execution time may be an estimate, but is preferably the actual execution time for an execution of the query. The execution time is then compared with the performance specification for the query that is stored in the access plan cache (step 430). If the performance specification for the query is satisfied (step 440=YES), the access plan is stored in the access plan cache in the entry corresponding to the query (step 450). If the actual performance of the new access plan is considerably better than the current performance specification, the performance specification for the query could also optionally be updated (step 452) to reflect the better performance of the newly-generated access plan. At this point, method 400 is done. If the performance specification is not satisfied (step 440=NO), and if there are more access plans to try (step 460=YES), a new access plan is generated for the query (step 470), and method 400 then loops back to step 420. This process continues until either the performance specification is satisfied (step 440=YES), or the performance specification is not satisfied (step 440=NO) and there are no more access plans to try (step 460=NO). Note that step 460 does not imply that every conceivable access plan must be generated (or tried). If the optimizer can determine that the remaining access plans that could be generated will be more inefficient than those already generated, the optimizer may determine that there are no more access plans to try (step 460=NO), even if there remain access plans for the query that have not yet been generated. If the performance specification is not satisfied (step 440=NO) and there are no more access plans to try (step 460=NO), the access plan with the best performance is stored in the access plan cache (step 480). In addition, the best performance may be used to generate a new performance specification for the query (step 490). Note that step 490 is optional, and therefore need not necessarily be performed.

Method 400 may be performed at any suitable time within the scope of the preferred embodiments. For example, different query implementations could be run during a calibration run of the database. In the alternative, method 400 may be performed at any time, or even every time a query is executed.

An example now follows that will illustrate the concepts of the present invention. Refer to the query in FIG. 5 and the corresponding tables in FIG. 6. To execute the query in FIG. 5, the query optimizer must decide on a join order for the tables. We assume for this example that the join order for the tables in the access plan is X->Y->Z, as shown in the access plan cache entry in FIG. 7. We also assume for this example that the performance specification is 30 time units, where a time unit is defined as the time required to probe the database. Suppose the access plan for a join order of X->Y->Z as shown in the access plan cache entry in FIG. 7 takes 10 "X probes" which requires 20 "Y probes", each of which looks at Z once, for a total of 50 probes or time units. Because the execution time for the query using the access plan shown in FIG. 7 requires 50 time units, and because the performance specification for the query in FIG. 7 is 30 time units (step 440 in FIG. 4=NO), the query optimizer generates other access plans to see if an access plan can be generated that meets the performance specification of 30 time units. We assume that the join order X->Z->Y is then generated in an access plan in step 470 of FIG. 4. The execution time for the new access plan is then determined in step 420. For a join order of X->Z->Y, there are 10 "X probes", but for each X probe there is only one look into Z for a total of 20 time units, and Y is never touched. The 20 time units for the newly-generated access plan with a join order of X->Z->Y satisfies the performance specification of 30 time units (step 440=YES), so the new access plan is stored in the entry in the access plan cache corresponding to the query, as shown in FIG. 8. This simple example demonstrates that the query optimizer is able to detect when an existing access plan for a query will violate the performance specification for the query, and can autonomically generate other access plans. If an access plan that satisfies the performance specification for the query is generated, it is stored as the access plan for the query in the access plan cache (step 450). If no access plan is generated that satisfies the performance specification for the query, the access plan with the best performance is stored as the access plan for the query in the access plan cache (step 480).

The performance specification for a query may be specified in any suitable units of measurement. Examples of some suitable units of measurement are shown in FIGS. 8-12 by way of example. In FIG. 8, the unit of measurement for the performance specification is "time units", which are defined as probes to the database. The unit of measurement for the performance specification in FIG. 9 is an absolute time measurement in seconds, such as 100 ms. The unit of measurement for the performance specification in FIG. 10 is specified in processor cycles. The unit of measurement for the performance specification in FIG. 11 is specified in bus cycles. The unit of measurement for the performance specification in FIG. 12 is specified in disk I/Os. FIG. 13 presents an interesting case of a "sliding scale" where the value of the performance specification depends on the value of a target execution time for the query. The "target time" is abbreviated in FIG. 13 as TT. Thus, if the target time is less than 100 ms, the performance specification is 10 times the target time. If the target time is between 100 ms and 10 seconds, the performance specification is 3 times the target time. If the target time is between 10 seconds and eight hours, the performance specification is 2 times the target time. If the target time is over eight hours, the performance specification is 1.5 times the target time. In essence, the sliding scale shown in FIG. 13 allows specifying different performance specifications for a query depending on the target time for executing the query.

FIG. 14 presents another interesting case of a performance specification that evolves as the database changes. The performance specification can be the arithmetic mean (or average) of the last N executions, where N is some suitable integer. If the query performance gradually degrades over time due to growth of the size of a table, for example, the performance specification can also gradually change to reflect the change in the database. Note that the examples in FIGS. 8-14 are merely examples, and are not limiting of the invention. The preferred embodiments expressly extend to any and all ways of specifying a performance specification, regardless of units of measurement or heuristic used. For example, certain thresholds could be set that specify that the execution time for a query was X % worse than the query performance specification. In the alternative, other metrics could be computed such as standard deviation of execution times that would cause the query optimizer to only generate new query implementations when something is really wrong (i.e., when the execution time for a query is outside one or two standard deviations of past execution times).

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the performance specification is shown herein to be a dedicated entry in the access plan cache for the query, a performance specification could be stored elsewhere. For example, a single algorithmic performance specification such as that shown in FIG. 13 or FIG. 14 could be defined for the database manager that allows on-the-fly computation for all queries without storing values in each entry in the access plan cache.

The invention claimed is:

1. An apparatus comprising:
   at least one processor;
   a memory coupled to the at least one processor;
   an access plan cache residing in the memory, the access plan cache including a plurality of entries, each entry including a performance specification for a corresponding query and an access plan for the corresponding query, the performance specification specifying a desired maximum number of bus cycles for the corresponding query that comprises an average of bus cycles over the last N executions of the query, where N is a predetermined positive integer; and
   a query optimizer residing in the memory and executed by the at least one processor, wherein the query optimizer determines number of bus cycles required to execute a query using an access plan stored in the access plan cache and compares the number of bus cycles required to execute the query with the performance specification corresponding to the query, wherein the query optimizer generates a new access plan if the number of bus cycles required to execute the query using the access plan stored in the access plan cache exceeds the performance specification corresponding to the query, wherein, if the query optimizer generates a new access plan that satisfies the performance specification corresponding to the query, the query optimizer stores the new access plan in an entry in the access plan cache that corresponds to the query and updates the performance specification corresponding to the query with an actual number of bus cycles during execution of the query, and wherein, if the query optimizer cannot generate a new access plan that satisfies the performance specification corresponding to the query, the query optimizer selects a new access plan that had the best number of bus cycles during execution of the query, stores the new access plan in the entry in the access plan cache that corresponds to the query, and stores in the access plan cache the best number of bus cycles as a new stored performance specification corresponding to the query.

2. A method for optimizing a query, the method comprising the steps of:

(A) storing a performance specification for the query and an access plan for the query in an access plan cache, the access plan cache including a plurality of entries, each entry including a performance specification for a corresponding query and an access plan for the corresponding query, the stored performance specification specifying a desired maximum bus cycles for the query that comprises an average of bus cycles over the last N executions of the query, where N is a predetermined positive integer;

(B) determining a number of bus cycles required to execute the query using an access plan stored in the access plan cache;

(C) comparing the number of bus cycles required to execute the query in step (B) with the stored performance specification for the query;

(D) generating a new access plan if the number of bus cycles required to execute the query using the access plan stored for the query exceeds the stored performance specification for the query;

(E) determining number of bus cycles for executing the new access plan;

(F) if a new access plan is generated in step (D) that has a number of bus cycles in step (E) that satisfies the performance specification for the query, storing the new access plan in an entry in the access plan cache that corresponds to the query and updating the performance specification corresponding to the query; and (G) if a new access plan is not generated in step (D) that has a number of bus cycles determined in step (E) that satisfies the corresponding stored performance specification for the query, selecting a new access plan that had the best number of bus cycles in step (E), storing the new access plan in the entry in the access plan cache that corresponds to the query, and storing the best number of bus cycles in step (E) as a new stored performance specification corresponding to the query.

* * * * *